(12) United States Patent
Kao et al.

(10) Patent No.: US 8,881,462 B2
(45) Date of Patent: Nov. 11, 2014

(54) DOOR STRUCTURE

(75) Inventors: San-Pao Kao, New Taipei (TW); Chen-Yi Liang, New Taipei (TW); Cheng-Hsiang Chuang, New Taipei (TW)

(73) Assignee: Wistron Corporation, Hsichih, New Taipei City (TW)

( * ) Notice: Subject to any disclaimer, the term of this patent is extended or adjusted under 35 U.S.C. 154(b) by 0 days.

(21) Appl. No.: 13/413,660

(22) Filed: Mar. 7, 2012

(65) Prior Publication Data

US 2012/0297689 A1 Nov. 29, 2012

(30) Foreign Application Priority Data

May 27, 2011 (TW) .............................. 100118616 A

(51) Int. Cl.
*E05C 21/02* (2006.01)
(52) U.S. Cl.
USPC ............. 49/465; 49/463; 361/616; 312/223.2
(58) Field of Classification Search
USPC .................. 49/463, 465; 312/223.2; 429/100; 361/616; 379/433.11
See application file for complete search history.

(56) References Cited

U.S. PATENT DOCUMENTS

| | | | | |
|---|---|---|---|---|
| 5,714,716 A * | 2/1998 | Yamada | ........................ | 174/542 |
| 6,000,769 A * | 12/1999 | Chen | .......................... | 312/223.2 |
| 6,002,581 A * | 12/1999 | Lindsey | .................... | 361/679.55 |
| 6,185,103 B1 * | 2/2001 | Yamada | ........................ | 361/727 |
| 6,400,562 B1 * | 6/2002 | Lee et al. | ................. | 361/679.02 |
| 6,480,398 B1 * | 11/2002 | Fiora et al. | ..................... | 361/816 |
| 6,873,523 B2 * | 3/2005 | Shyr | ........................ | 361/679.02 |
| 7,428,144 B2 * | 9/2008 | Peng et al. | ............... | 361/679.55 |
| 8,254,091 B2 * | 8/2012 | Yang | ........................ | 361/679.01 |
| 8,300,397 B2 * | 10/2012 | Zhang | ...................... | 361/679.33 |
| 2003/0223191 A1 | 12/2003 | Shyr | | |
| 2010/0143780 A1 * | 6/2010 | Yang et al. | ..................... | 429/100 |
| 2012/0281366 A1 * | 11/2012 | Strittmatter et al. | .......... | 361/724 |

OTHER PUBLICATIONS

Office action mailed on Jul. 22, 2013 for the Taiwan application No. 100118616, filing date: May 27, 2011, p. 2 and p. 3 line 1~23.
Office action mailed on Jul. 10, 2014 for the China application No. 201110156905.4, p. 3 line 4~20.

\* cited by examiner

*Primary Examiner* — Gregory J Strimbu
(74) *Attorney, Agent, or Firm* — Winston Hsu; Scott Margo

(57) ABSTRACT

A door structure includes a cover for covering an accommodating space formed on a housing, a lodging part connected to an end of the cover for lodging in a slot on the housing, and a first inverse hook part connected to the housing and disposed adjacent to a hole on the housing. A first inclined surface is formed on a side of the first inverse hook part. The door structure further includes a second inverse hook part connected to a side of the cover. A second inclined surface is formed on a side of the second inverse hook part. The second inverse hook part is inserted into the hole on the housing so that the second inclined surface of the second inverse hook part wedges with the first inclined surface of the first inverse hook part.

4 Claims, 9 Drawing Sheets

DOOR STRUCTURE

BACKGROUND OF THE INVENTION

1. Field of the Invention

The present invention relates to a door structure, and more specifically, to a door structure with inverse hook parts to engage each other.

2. Description of the Prior Art

People have to take apart computers when replacing broken components or upgrading instruments inside the computer. So computers capable of being disassembled easily are necessary. For example, as for mechanical design of a notebook computer, a door structure is often installed in back of a casing of the notebook computer for covering and protecting a memory module. However, there is a problem of broken hooks for engaging a cover and a housing, as assembling the conventional door structure. The hooks of the conventional door structure are assembled vertically to produce structural interference. The hooking area can be increased for enhancing combination strength of the hook, but the hook might be broken easily accordingly. On the other hand, the hooking area can be decreased for easy assembly, but it decreases combination strength of the hook accordingly. It is an important issue to design a door structure with easy assembly and enough combination strength for mechanical design of a computer casing.

SUMMARY OF THE INVENTION

The present invention provides a door structure with inverse hook parts to engage each other, to solve the problems mentioned above.

According to the disclosure, a door structure includes a cover for covering an accommodating space formed on a housing, a lodging part connected to an end of the cover for lodging in a slot on the housing, and a first inverse hook part connected to the housing and disposed adjacent to a hole on the housing. A first inclined surface is formed on a side of the first inverse hook part. The door structure further includes a second inverse hook part connected to a side of the cover. A second inclined surface is formed on a side of the second inverse hook part. The second inverse hook part is inserted into the hole on the housing so that the second inclined surface of the second inverse hook part wedges with the first inclined surface of the first inverse hook part.

According to the disclosure, the first inclined surface of the first inverse hook part and the second inclined surface of the second inverse hook part are arc surfaces.

According to the disclosure, at least a portion of the second inclined surface contacts with the first inclined surface as the second inclined surface of the second inverse hook part wedges with the first inclined surface of the first inverse hook part.

According to the disclosure, a protrusion is formed on the other end of the cover.

According to the disclosure, a hook is formed on the first inclined surface of the first inverse hook part, a slot is formed on the second inclined surface of the second inverse hook part, and the hook hooks the slot as the second inclined surface of the second inverse hook part wedges with the first inclined surface of the first inverse hook part.

According to the disclosure, the door structure further includes a fastening component for fastening the cover on the housing.

The door structure of the present invention fastens the cover on the housing with rotary mechanism, and it can reduce assembly complexity. The hooked engagement of the inverse hook parts can provide effective locking strength so that the cover cannot separate from the housing easily. The door structure of the present invention can solve the problem of the conventional door structure with the hook being broken easily or of low combination strength. Hence, the present invention provides the door structure with easy assembly and enough combination strength.

These and other objectives of the present invention will no doubt become obvious to those of ordinary skill in the art after reading the following detailed description of the embodiment that is illustrated in the various figures and drawings.

DETAILED DESCRIPTION

Figure 1:
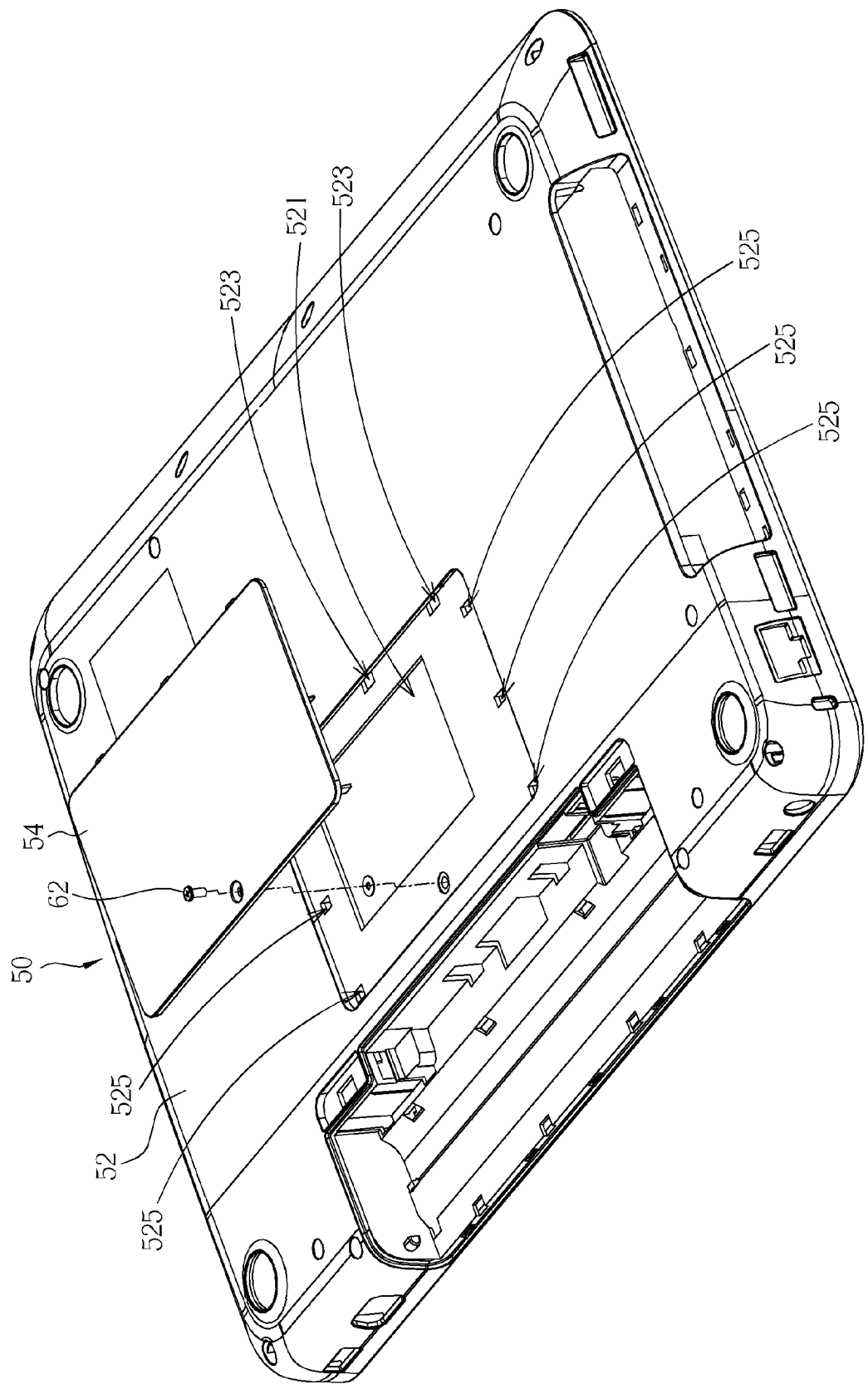
FIG. 1 is an exploded drawing of a door structure according to a first embodiment of the present invention.
Figure 2:
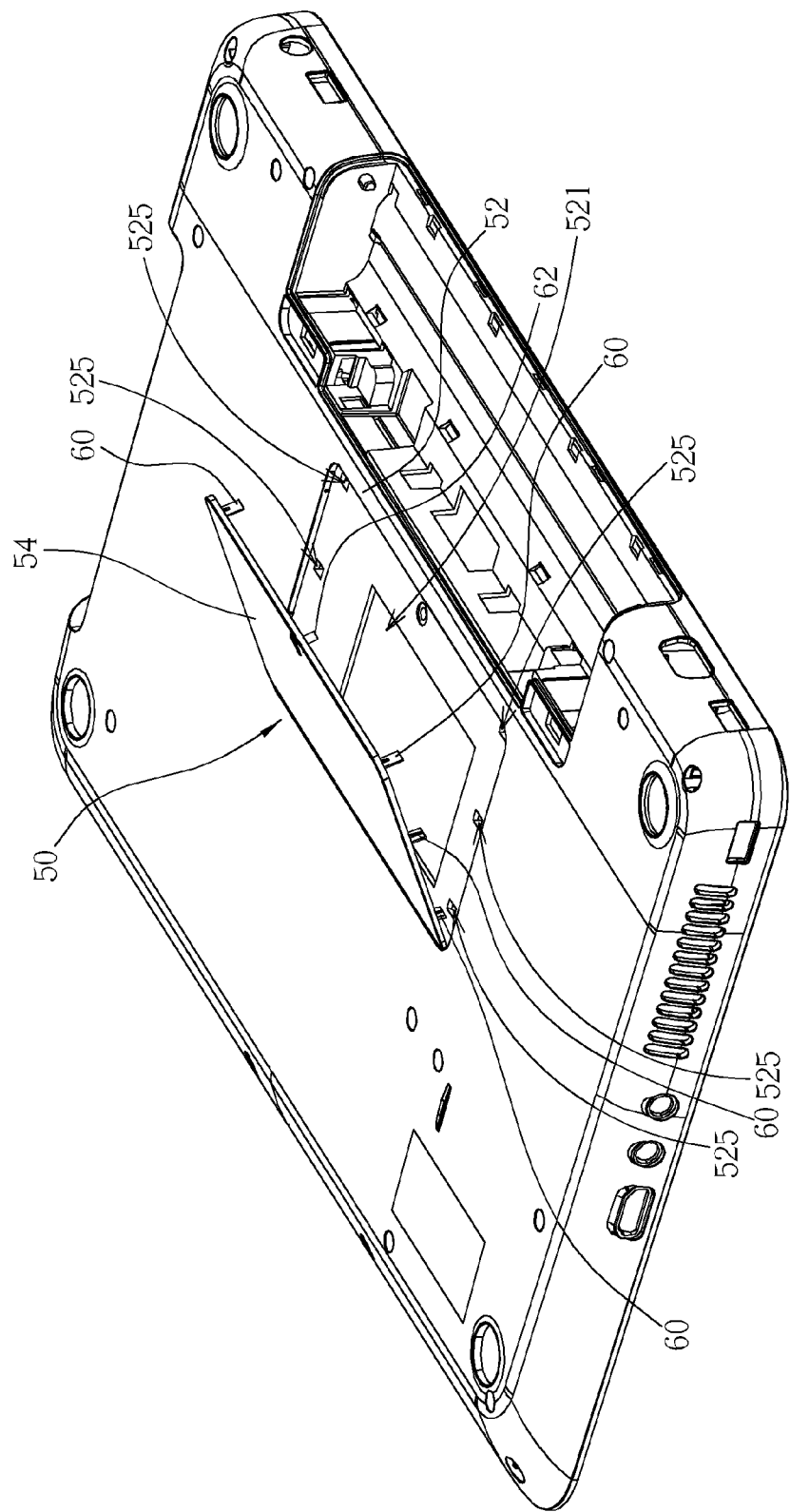
FIG. 2 is a schematic drawing of the door structure having not been installed on an electronic device according to the first embodiment of the present invention.
Figure 3:
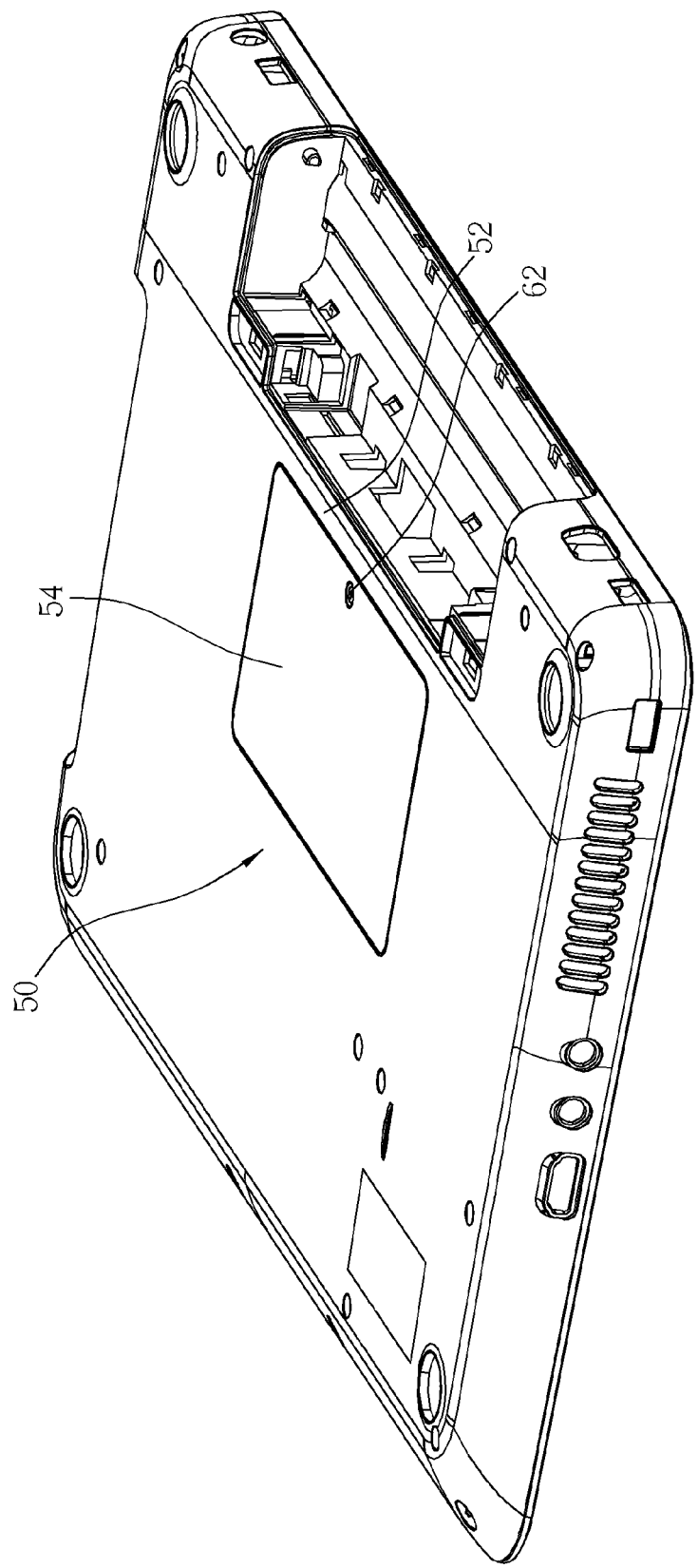
FIG. 3 is a schematic drawing of the door structure having been installed on the electronic device according to the first embodiment of the present invention.
Figure 4:
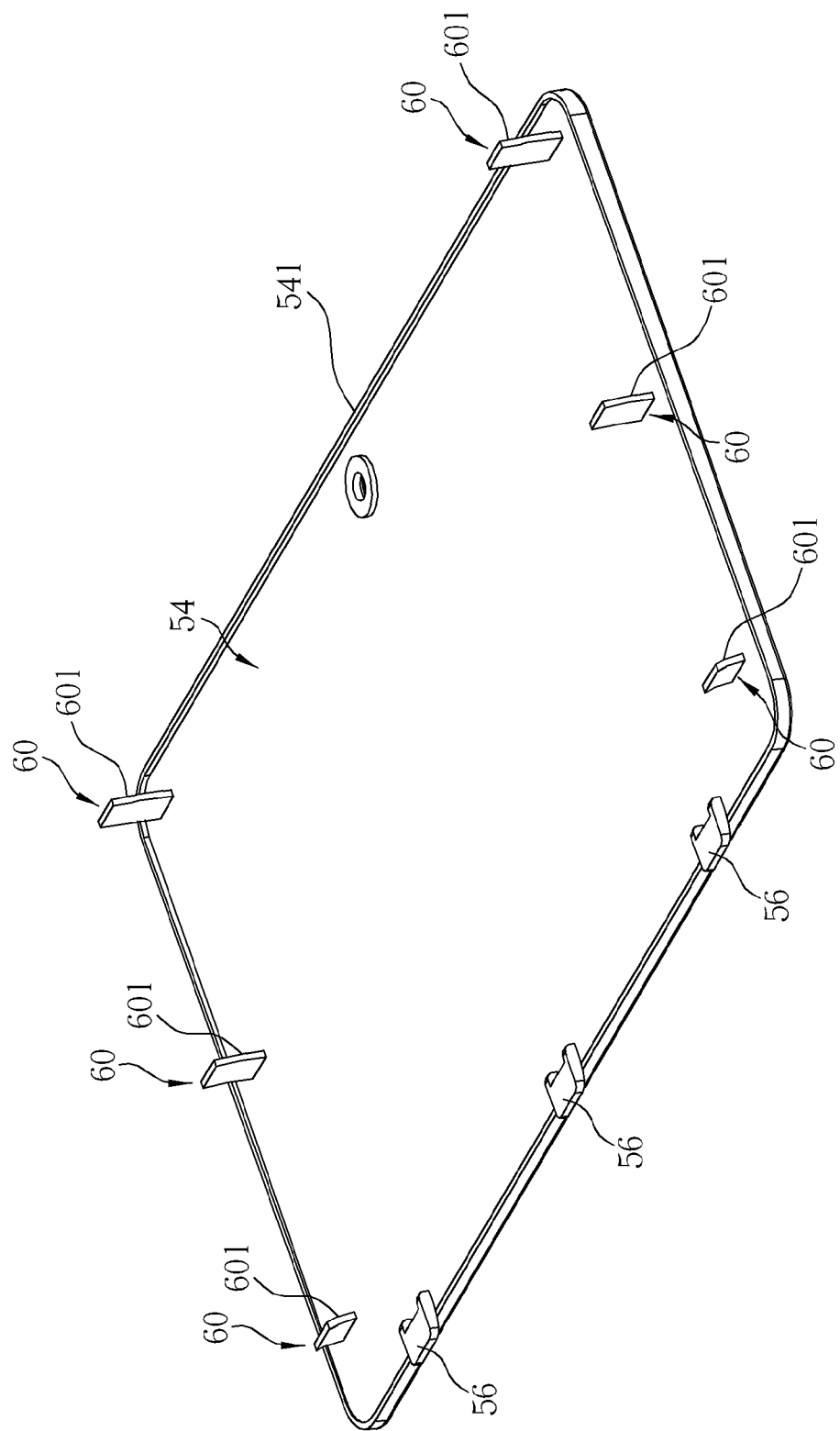
FIG. 4 is a bottom view of a cover according to the first embodiment of the present invention.
Figure 5:
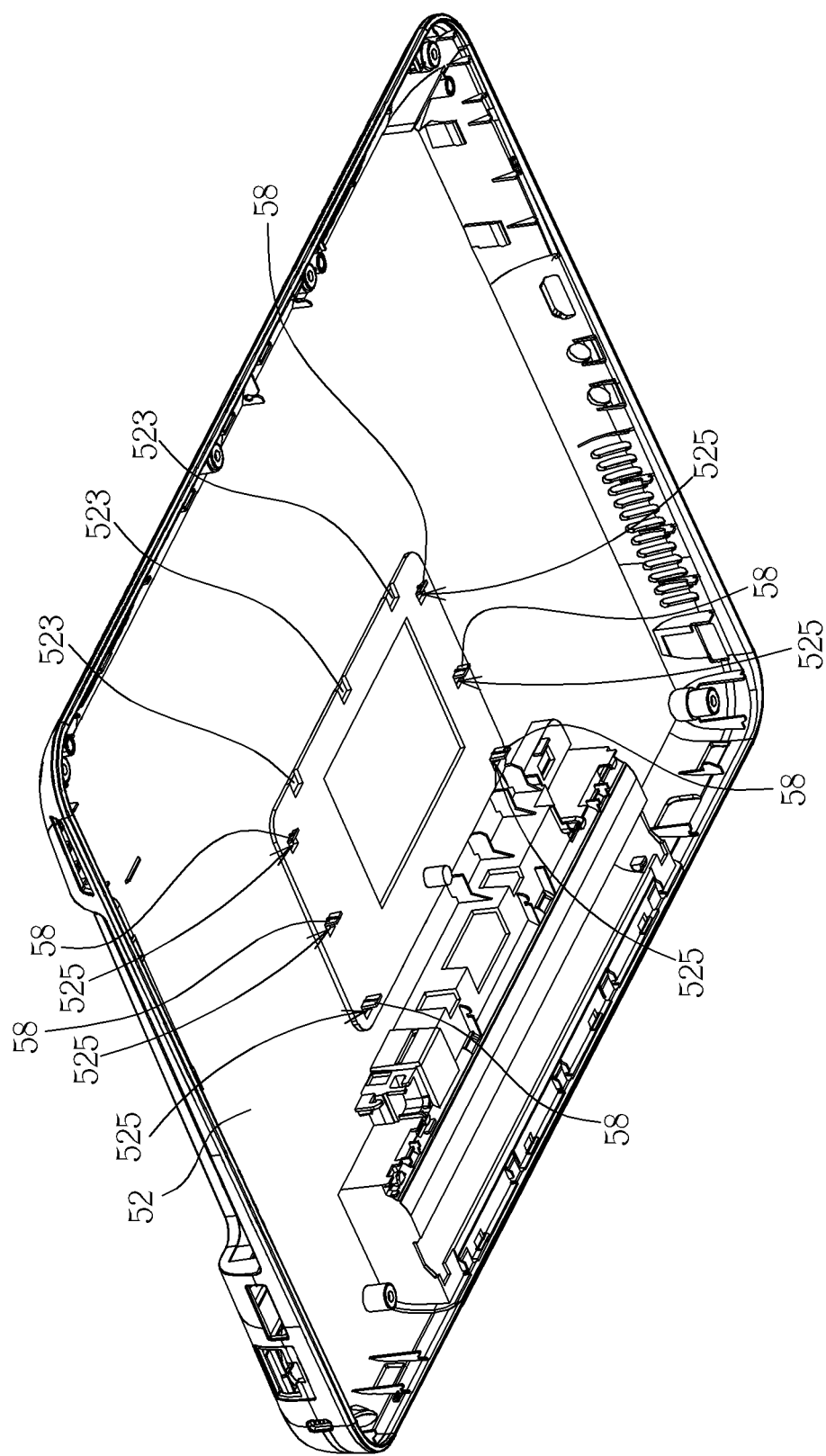
FIG. 5 is an internal diagram of a housing according to the first embodiment of the present invention.

Please refer to FIG. 1 to FIG. 3. FIG. 1 is an exploded drawing of a door structure 50 according to a first embodiment of the present invention. FIG. 2 is a schematic drawing of the door structure 50 having not been installed on an electronic device according to the first embodiment of the present invention. FIG. 3 is a schematic drawing of the door structure 50 having been installed on the electronic device according to the first embodiment of the present invention. The door structure 50 can be installed on a housing 52 of a notebook computer for shielding a memory module. The door structure 50 includes a cover 54 for covering an accommodating space 521 formed on the housing 52, and the cover 54 can be a memory module cover. Please refer to FIG. 1 to FIG. 5. FIG. 4 is a bottom view of the cover 54 according to the first embodiment of the present invention. FIG. 5 is an internal diagram of the housing 52 according to the first embodiment of the present invention. The door structure 50 further includes at least one lodging part 56 connected to an end of the cover 54 for lodging in a slot 523 on the housing 52. The lodging part 56 can be a tenon and integrated with the cover 54 monolithically. A protrusion 541 is formed on the other end of the cover 54. The door structure 50 further includes a first inverse hook part 58 connected to the housing 52 and extending inward the housing 52. The first inverse hook part 58 is disposed adjacent to a hole 525 on the housing 52. A first inclined surface 581 is formed on a side of the first inverse hook part 58, and the first inclined surface 581 can be an arc surface. The first inverse hook part 58 can be integrated with the housing 52 monolithically. The door structure 50 further includes at least one second inverse hook part 60 connected to a bottom side of the cover 54. A second inclined surface 601 is formed on a side of the second inverse hook part 60, and the second inclined surface 601 also can be an arc surface so that the first inclined surface 581 contacts with at least a portion of the second inclined surface 601 as the second inclined surface 601 of the second inverse hook part 60 wedges with the first inclined surface 581 of the first inverse hook part 58. That is, the second inclined surface 601 of the second inverse hook part 60 can wedge with the first inclined surface 581 of the first inverse hook part 58 tightly. The second inverse hook part 60 can be integrated with the cover 54 monolithically. Furthermore, the door structure 50 further includes a fastening component 62 for fastening the cover 54 on the housing 52, and the fastening component 62 can be a screw. The disposal and the amount of the lodging part 56, the first inverse hook part 58, the second inverse hook part 60 and the corresponding slot 523 and hole 525 are not limited to those in this embodiment, and it depends on actual design demand.

Figure 6:
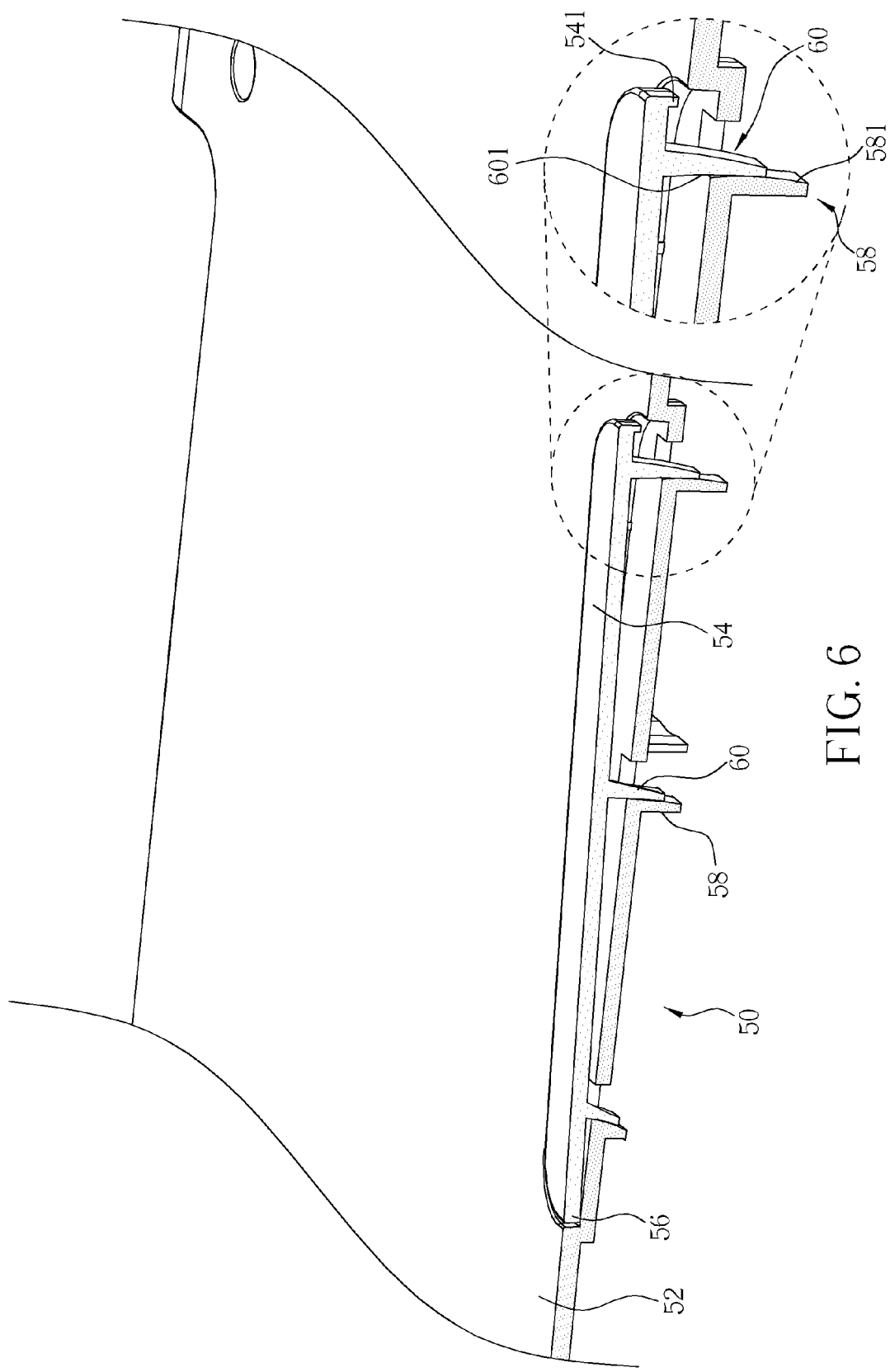
FIG. 6 is a sectional diagram of the cover having not been wedged into the housing according to the first embodiment of the present invention.
Figure 7:
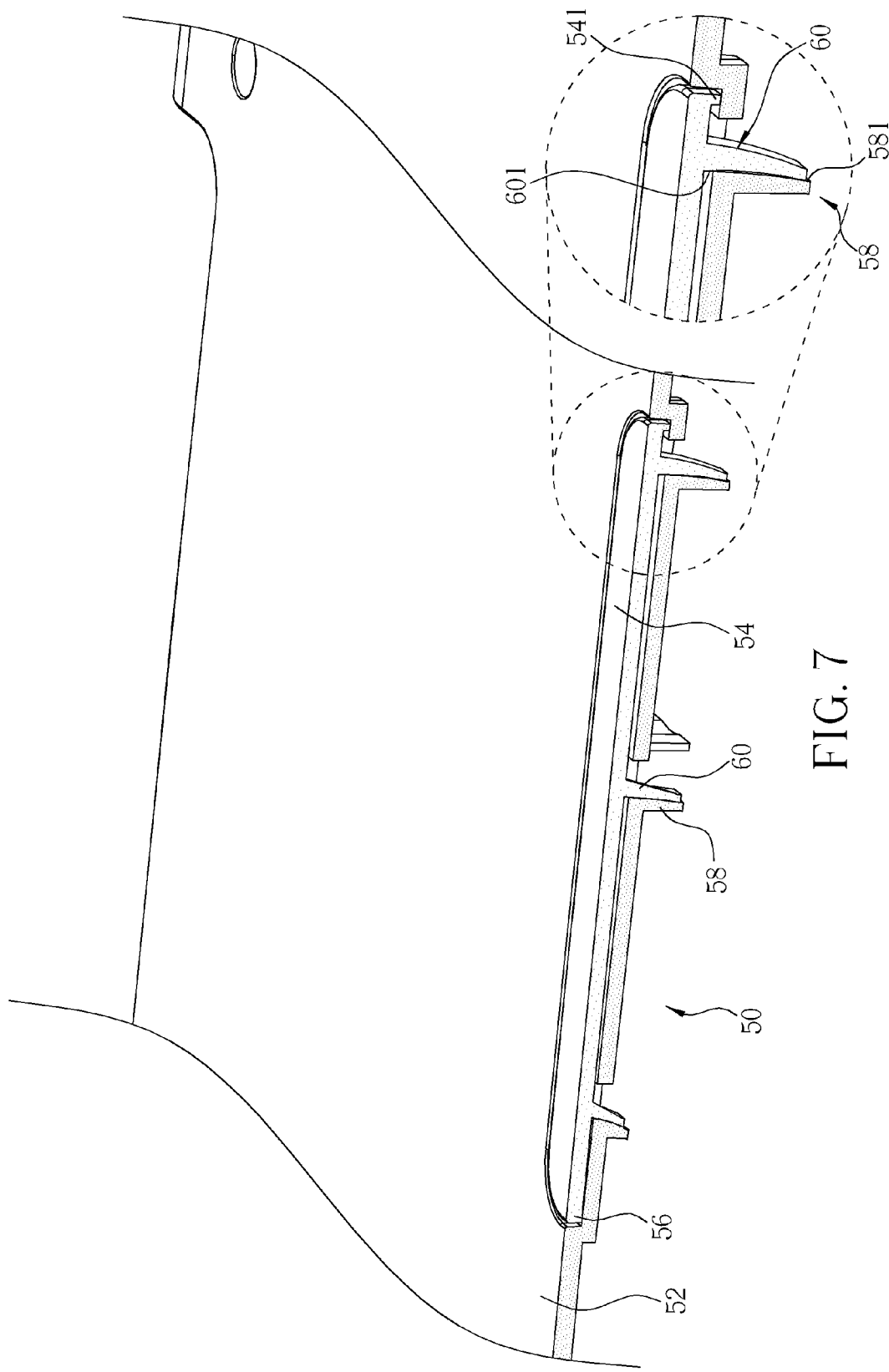
FIG. 7 is a sectional diagram of the cover having been wedged into the housing according to the first embodiment of the present invention.

Please refer to FIG. 1 to FIG. 7. FIG. 6 is a sectional diagram of the cover 54 having not been wedged into the housing 52 according to the first embodiment of the present invention. FIG. 7 is a sectional diagram of the cover 54 having been wedged into the housing 52 according to the first embodiment of the present invention. As assembling the cover 54 on the housing 52, each lodging part 56 can be lodged in the corresponding slot 523 on the housing 52 first, and the lodging position of the lodging part 56 and the slot 523 can be a rotary fulcrum for the cover 54. Then, the cover 54 can be rotated relative to the lodging position of the lodging part 56 and the slot 523 so that the second inverse hook part 60 on the cover 54 inserts into the hole 525 on the housing 52. As the cover 54 is rotating close to the housing 52, the contacting area of the first inclined surface 581 of the first inverse hook part 58 and the second inclined surface 601 of the second inverse hook part 60 is increasing accordingly. There is no structural interference between the first inverse hook part 58 and the second inverse hook part 60 during the rotation of the cover 54. That is, the second inverse hook part 60 can smoothly slide on the first inverse hook part 58 as the second inclined surface 601 of the second inverse hook part 60 wedges with the first inclined surface 581 of the first inverse hook part 58 and the first inclined surface 581 contacts with at least a portion of the second inclined surface 601. When the cover 54 rotates to a position where the cover 54 completely covers the accommodating space 521 on the housing 52, the cover 54 can be substantially parallel with a side surface of the housing 63, and the second inclined surface 601 of the second inverse hook part 60 tightly wedges with the first inclined surface 581 of the first inverse hook part 58. The hooked engagement of the first inverse hook part 58 and the second inverse hook part 60 can provide effective locking strength due to complete contact of the first inclined surface 581 and the second inclined surface 601 so that the cover 54 cannot separate from the housing 52 easily. Additionally, the fastening component 62 can be utilized for fastening the cover 54 on the housing 52 selectively for enhancing the fixing effect of the cover 54 on the housing 52. Furthermore, a protrusion 541 is formed on the other end of the cover 54. The user can apply force on the protrusion 541 on the cover 54 so as to pull the cover 54 reversely for dissembling the cover 54 from the housing 52. Then the second inverse hook part 60 can be separated from the hole 525 on the housing 52, and the lodging part 56 can be drawn out of the slot 523 to take off the cover 54 from the housing 52.

Figure 8:
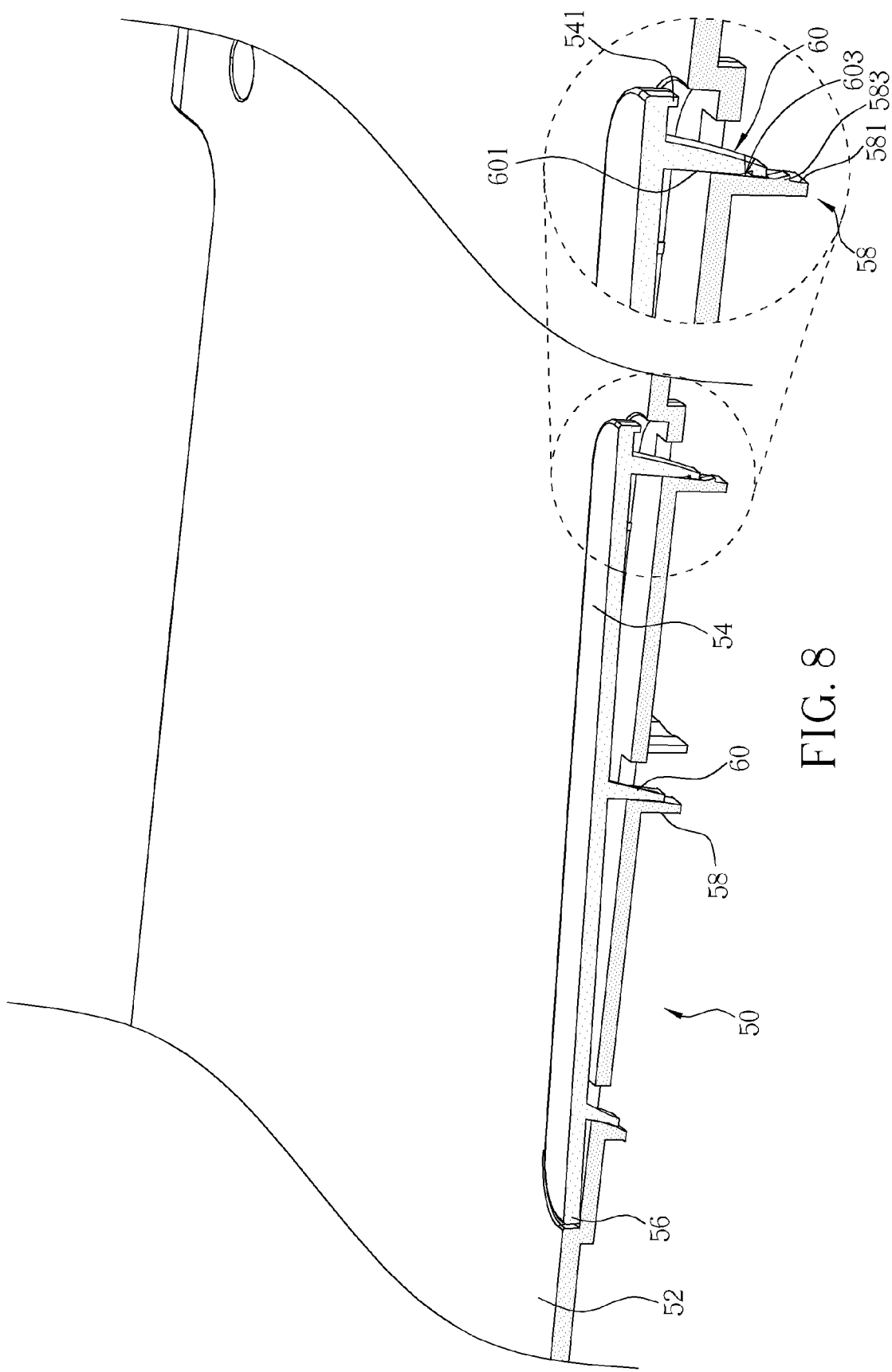
FIG. 8 is a sectional diagram of the cover having not been wedged into the housing according to a second embodiment of the present invention.
Figure 9:
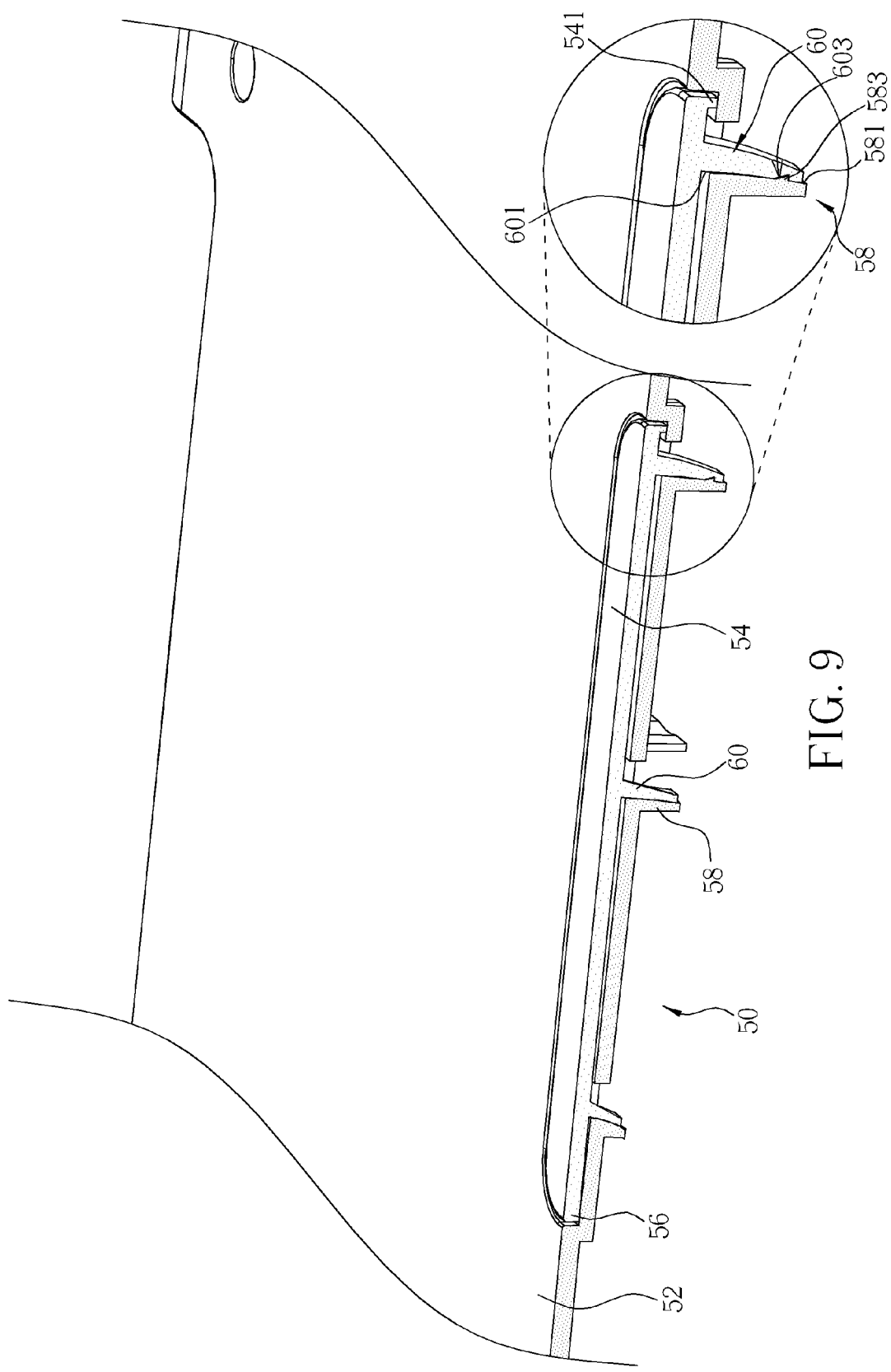
FIG. 9 is a sectional diagram of the cover having been wedged into the housing according to the second embodiment of the present invention.

Please refer to FIG. 8 and FIG. 9. FIG. 8 is a sectional diagram of the cover 54 having not been wedged into the housing 52 according to a second embodiment of the present invention. FIG. 9 is a sectional diagram of the cover 54 having been wedged into the housing 52 according to the second embodiment of the present invention. The difference between the first embodiment and the second embodiment is that at least one hook 583 is formed on the first inclined surface 581 of the first inverse hook part 58, at least one slot 603 is formed on the second inclined surface 601 of the second inverse hook part 60, and the hook 583 of the first inverse hook part 58 hooks the slot 603 of the second inverse hook part 60 as the second inclined surface 601 of the second inverse hook part 60 wedges with the first inclined surface 581 of the first inverse hook part 58 of the second embodiment. Besides the hooked engagement of the first inclined surface 581 and the second inclined surface 601, the engagement of the hook 583 and the slot 603 further can enhance the locking strength of the cover 54 on the housing 52 so that the cover 54 can be fixed on the housing 52 effectively. The hook and the slot also can be disposed outside the inverse hook parts as separate structures. The hook 583 and the slot 603 also can be disposed on the first inverse hook part 58 and the second inverse hook part 60 selectively. For example, the hooks 583 and the slots 603 can only disposed on parts of the first inverse hook parts 58 and the second inverse hook parts 60, and it depends on actual design demand.

In contrast to the prior art, the door structure of the present invention fastens the cover on the housing with rotary mechanism, and it can reduce assembly complexity. The hooked engagement of the inverse hook parts can provide effective locking strength so that the cover cannot separate from the housing easily. The door structure of the present invention can solve the problem of the conventional door structure with the hook being broken easily or of low combination strength. Hence, the present invention provides the door structure with easy assembly and enough combination strength.

Those skilled in the art will readily observe that numerous modifications and alterations of the device and method may be made while retaining the teachings of the invention.

What is claimed is:

1. A door structure comprising:
   a cover for covering an accommodating space formed in a housing;
   a lodging part connected to an end of the cover for lodging in a slot on the housing;
   at least one first inverse hook part connected to the housing and disposed adjacent to a hole on the housing, the at least one first inverse hook part having a first fixing end connected to the housing and a first free end opposite to the first fixing end, a first inclined surface being formed on a side of the at least one first inverse hook part and extending from the first fixing end to the first free end of the at least one first inverse hook part; and
   at least one second inverse hook part connected to a side of the cover, the at least one second inverse hook part having a second fixing end connected to the cover and a second free end opposite to the second fixing end, a second inclined surface being formed on a side of the at least one second inverse hook part and extending from the second fixing end to the second free end of the at least one second inverse hook part, and the at least one second inverse hook part being inserted into the hole on the housing so that the second inclined surface of the at least one second inverse hook part wedges with the first inclined surface of the at least one first inverse hook part when the cover is in a closed position, wherein the first inclined surface of the at least one first inverse hook part and the second inclined surface of the at least one second inverse hook part are arc surfaces with substantially the same continuous curvature, a contacting area of the first inclined surface and the second inclined surface is increasing as the cover is rotating toward the housing and said closed position, and as the cover is rotating toward the housing and said closed position an arc movement of the at least one second inverse hook part corresponds to the continuous curvature of the first inclined surface of the at least one first inverse hook part so that there is no structural interference between the at least one first inverse hook part and the at least one second inverse hook part during rotation of the cover toward the housing and said closed position.

2. The door structure of claim 1, wherein a protrusion is formed on another end of the cover.

3. The door structure of claim 1, wherein a hook is formed on the first inclined surface of the at least one first inverse hook part, a slot is formed on the second inclined surface of the at least one second inverse hook part, and the hook engages the slot when the second inclined surface of the at least one second inverse hook part wedges with the first inclined surface of the at least one first inverse hook part.

4. The door structure of claim 1, further comprising a fastening component for fastening the cover to the housing.

\* \* \* \* \*